US008672294B2

(12) United States Patent
Huang (10) Patent No.: US 8,672,294 B2
(45) Date of Patent: Mar. 18, 2014

(54) WALL-MOUNTED FAUCET CONTROL MODULE

(75) Inventor: Li-Chen Huang, Changhua Hsien (TW)

(73) Assignee: Alexander Yeh Industry Co., Ltd., Changhua Hsien (TW)

( * ) Notice: Subject to any disclaimer, the term of this patent is extended or adjusted under 35 U.S.C. 154(b) by 401 days.

(21) Appl. No.: 13/189,482

(22) Filed: Jul. 22, 2011

(65) Prior Publication Data

US 2013/0019708 A1 Jan. 24, 2013

(51) Int. Cl.
*F16K 31/00* (2006.01)
(52) U.S. Cl.
USPC ...... 251/291; 251/293; 137/359; 137/315.15; 74/548
(58) Field of Classification Search
USPC .................. 137/315.12, 315.14, 315.15, 359; 251/213, 231, 291, 292, 293; 74/548
See application file for complete search history.

(56) References Cited

U.S. PATENT DOCUMENTS

| 4,134,420 | A | * | 1/1979 | Okonowitz | 137/315.14 |
| 4,616,673 | A | * | 10/1986 | Bondar | 137/315.15 |
| 4,739,788 | A | * | 4/1988 | Reback | 137/15.18 |
| 4,842,009 | A | * | 6/1989 | Reback | 137/315.15 |
| 4,876,766 | A | * | 10/1989 | Cohen | 16/426 |
| 4,961,443 | A | * | 10/1990 | Buccicone et al. | 137/315.15 |
| 5,025,826 | A | * | 6/1991 | Schoepe et al. | 137/315.15 |
| 7,331,358 | B2 | * | 2/2008 | Gallina et al. | 137/315.15 |
| 7,987,869 | B2 | * | 8/2011 | Rosko et al. | 137/315.15 |
| 2013/0036854 | A1 | * | 2/2013 | Huang | 74/543 |
| 2013/0036855 | A1 | * | 2/2013 | Huang | 74/543 |
| 2013/0036856 | A1 | * | 2/2013 | Huang | 74/543 |
| 2013/0068063 | A1 | * | 3/2013 | Huang | 74/543 |

* cited by examiner

*Primary Examiner* — John K Fristoe, Jr.
*Assistant Examiner* — R. K. Arundale (57) ABSTRACT

A wall-mounted faucet control module comprises: two control handles, three joints and a panel set. Each control handle has a containment space for accepting the joints. The joint has an insertion aperture, the insertion aperture of each joint has a different cross-sectional shape such that the control handle can be installed with the various control rod. The panel set has an assembling panel and two ornament covers, the ornament cover engages with the connecting slot of the assembling panel, and the two ornament covers respectively have an assembling hole with different diameter such that the assembling panel can be installed with the main body of the various water valve. The joints, the sleeves and the ornament covers can be correspondingly alternated for the various water valves, the control handles and the panel set can be installed with the various water valves, which can provide variety and convenience.

8 Claims, 10 Drawing Sheets

WALL-MOUNTED FAUCET CONTROL MODULE

BACKGROUND OF THE INVENTION

1. Field of the Invention

The present invention relates to a wall-mounted faucet control module, and more particularly to a wall-mounted faucet control module which have different elements that can be correspondingly alternated, such that the control handles and the panel set can be installed with the various water valves, which can provide variety and convenience.

2. Description of the Related Art

Currently, people prefer faucets in various styles. Moreover, people like to do home improvement chores by themselves. However, each faucet has a control shaft having different cross-sectional shapes and dimensions, and so the consumer needs to select a matching faucet handle, which can be very inconvenient.

Therefore, it is desirable to provide a wall-mounted faucet control module to mitigate and/or obviate the aforementioned problems.

SUMMARY OF THE INVENTION

An objective of the present invention is to provide a wall-mounted faucet control module In order to achieve the above-mentioned objectives, a wall-mounted faucet control module configured for assembly with a recessed water valve comprises:

two control handles, each control handle having a containment space at a bottom face, the containment space of each control handle having a plurality of engaging ribs around an opening of the containment space and an assembly base, the engaging ribs having a groove at one end, each assembly base having a connecting rib and a through hole adjacent to the connecting rib, the through hole engaging with a screwing member, at least one of the control handles having an indentation slot at a top face, the indentation slot engaging with a sealing cover, the indentation slot having a first through aperture connected to the containment space, a U-shaped protruding portion disposed at a closed end of the containment space around the first through aperture, an engaging member disposed in the closed end of the containment space facing an opening of the protruding portion;

a plurality of joints, each joint disposed on the connecting rib of a corresponding control handle and between the groove of the engaging ribs and the assembly base or between the protruding portion of another control handle and the engaging member, each joint having an insertion aperture, each insertion aperture accepting the valve rod of the water valve, each insertion aperture having a different cross-sectional shape, each insertion aperture having an assembly aperture at one end, the assembly aperture providing a locking member; an assembling slot is disposed adjacent to the insertion aperture of each joint, the assembling slot engaging with the screwing member of the control handle, another two joints having a securing aperture connected to the insertion aperture adjacent to the assembling slot, the securing aperture engaging with a securing member; and a panel set having an assembling panel and at least two ornamental covers, the assembling panel installable onto a wall, the assembling panel having a connecting slot on one side, the connecting slot accepting the control handle, the connecting slot having an aperture and an installation hole, the installation hole having two assembling grooves at a peripheral edge, the ornamental cover engaging with the connecting slot of the panel, the ornamental cover having an assembling hole, the assembling hole facing the installation hole of the assembling panel, the assembling hole jacketing onto the main body of the water valve, the assembling holes of the two ornamental covers having different diameters, more than one second through apertures disposed on the ornamental cover adjacent the assembling hole, the second through aperture accepting a connecting member, the connecting member passing through the assembling groove of the assembling panel and locked with the water valve.

With the above-mentioned structure, following benefits can be obtained: since, the joints, the sleeves and the ornament covers can be correspondingly alternated for the various water valves, the control handles and the panel set can be installed with the various water valves, which can provide variety and convenience.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
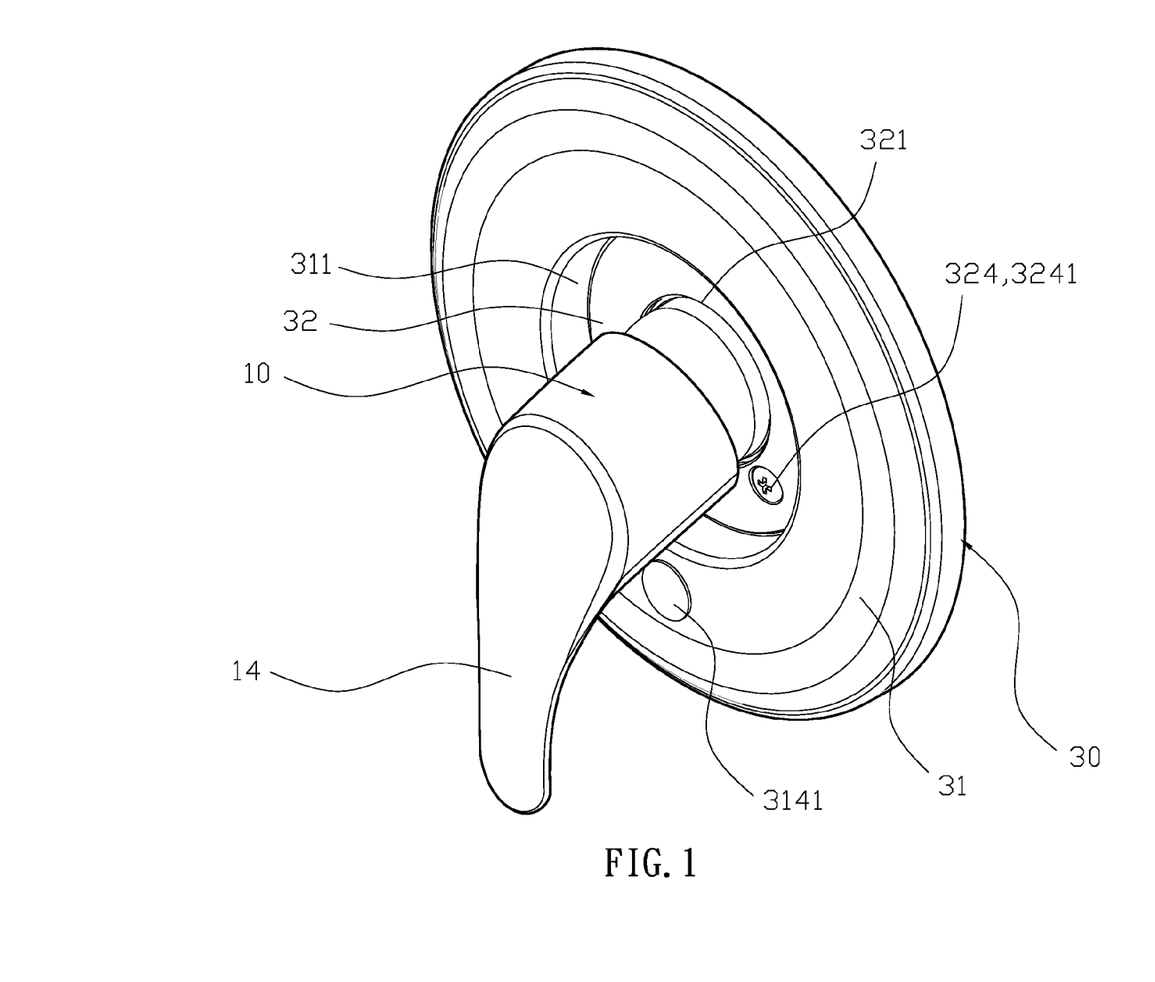
FIG. 1 is a perspective view of an embodiment of the present invention.
Figure 2:
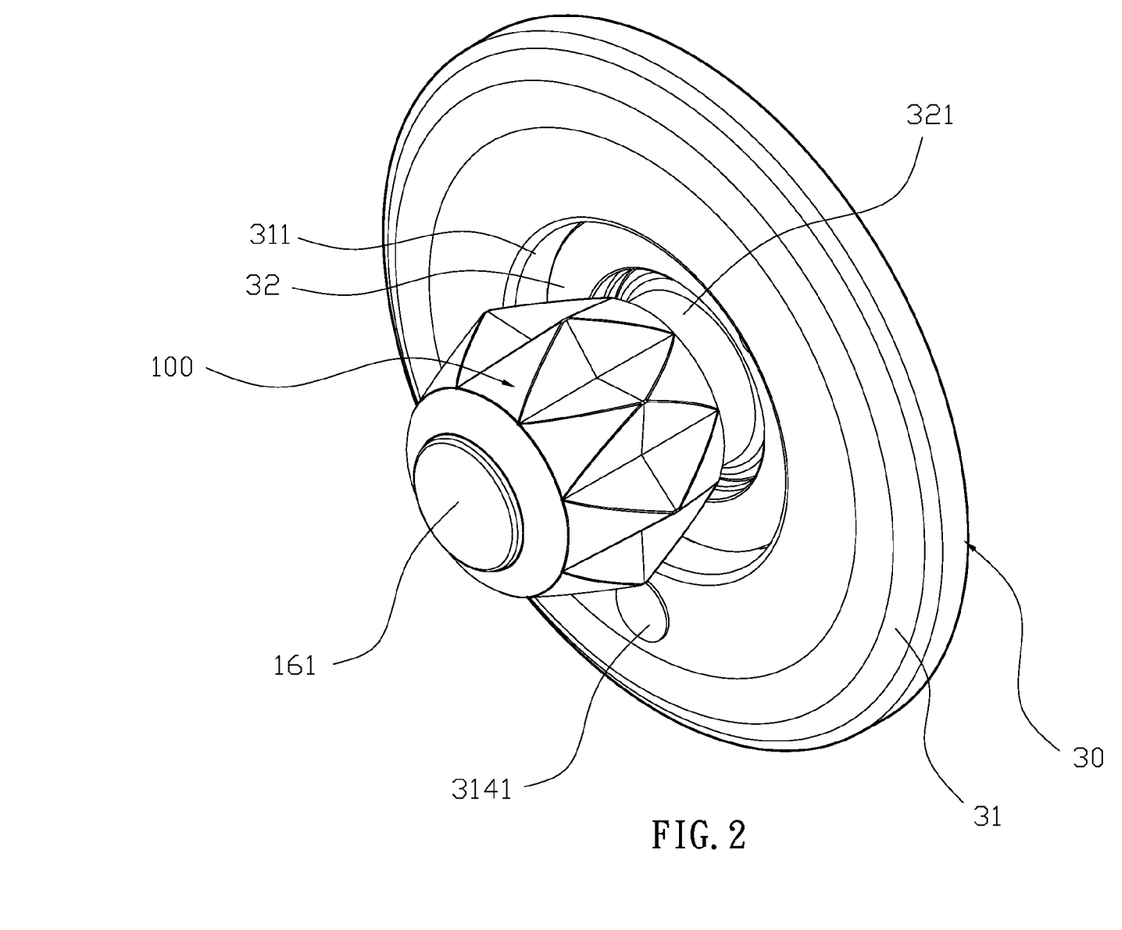
FIG. 2 is a perspective view of another control handle of an embodiment of the present invention.
Figure 3:
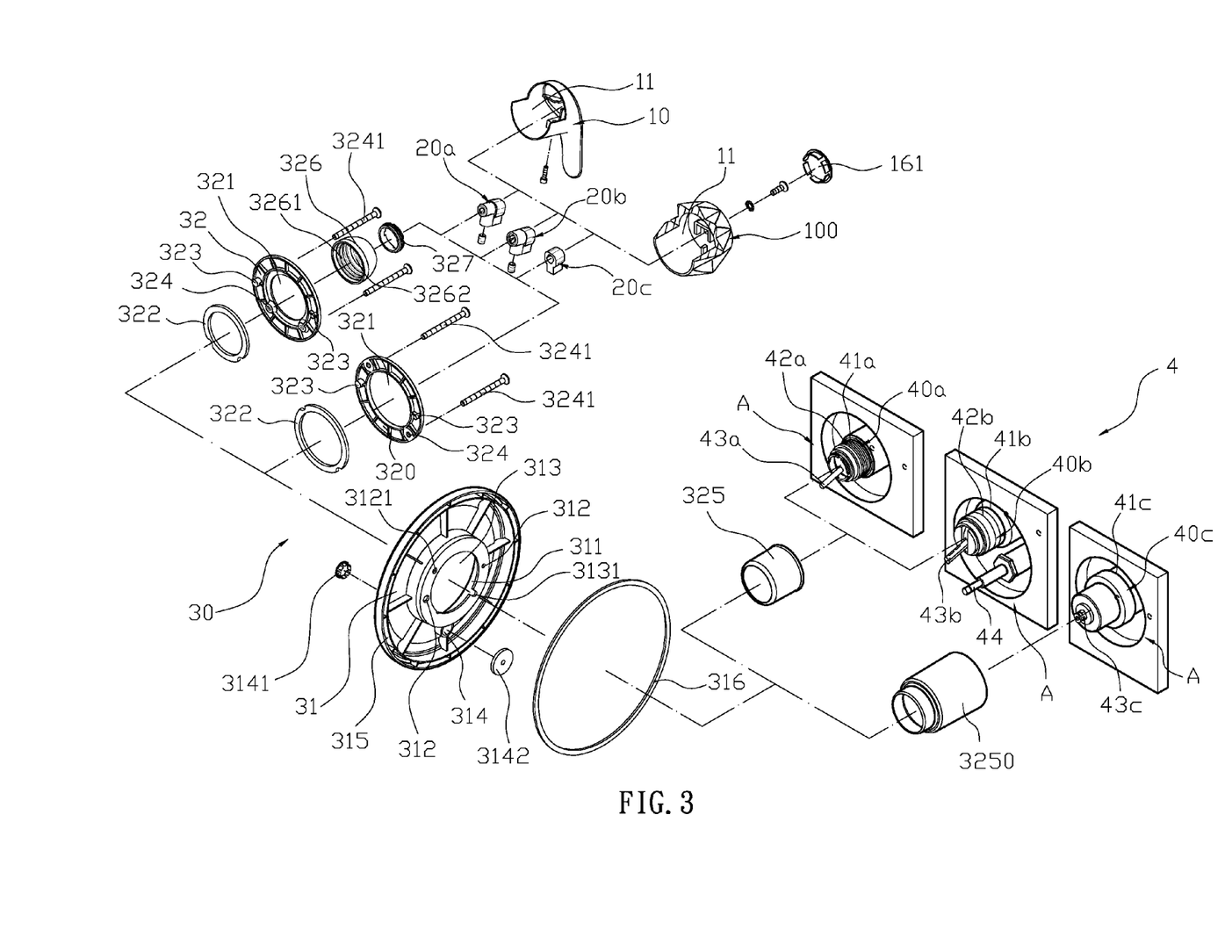
FIG. 3 is an exploded view of an embodiment of the present invention.
Figure 8:
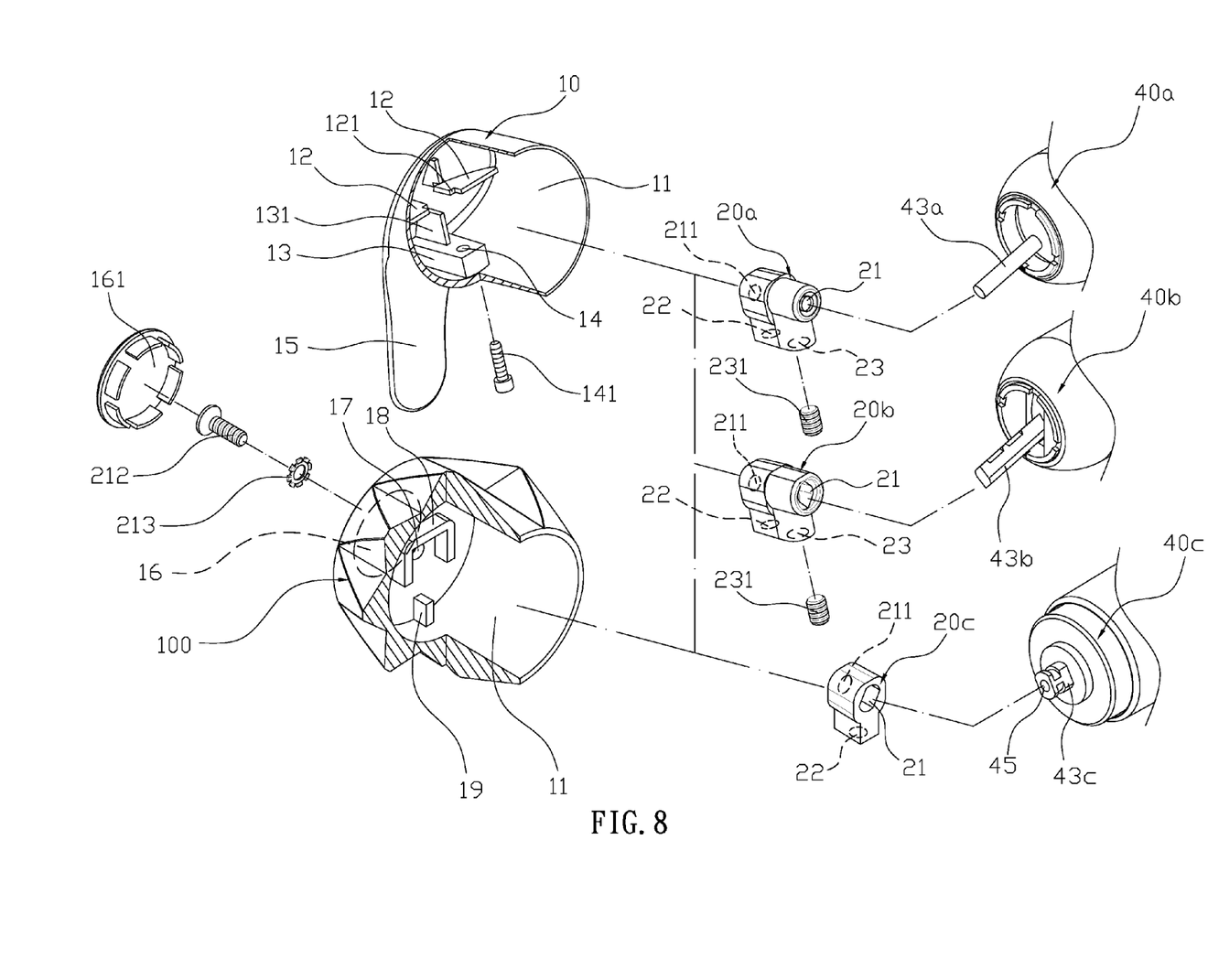
FIG. 8 is an exploded view of the control handle of an embodiment of the present invention.

Please refer to FIG. 1, FIG. 2, FIG. 3 with FIG. 8. A wall-mounted faucet control module configured for assembly with a recessed water valve 4 onto a wall surface A, comprises: two control handles 10, 100, three joints 20a, 20b, 20c and a panel set 30. Each control handle 10, 100 has a containment space 11, and the containment space 11 of the control handle 10 has a plurality of engaging ribs 12 evenly disposed around an opening of the containment space 11 and an assembly base 13. Each engaging rib 12 has a groove 121 at one end, and the assembly base 13 has a connecting rib 131 and a through hole 14 adjacent to an engaging rib 12. The connecting rib 131 has a height corresponding to the height of the grooves 121 of the engaging ribs 12. The through hole 14 is provided with a corresponding screwing member 141. The control handle 10 further has an extended handle portion 15.

Another control handle 100 has an indentation region 16 at a top face, the indentation region 16 engages with a sealing cover 161, and the indentation region 16 has a first through aperture 17 connected to the containment space 11. A U-shaped protruding portion 18 is disposed at a closed end of the containment space 11 around the first through aperture 17, and an engaging member 19 is disposed in the closed end of the containment space 11 facing an opening of the protruding portion 18. The joints 20a, 20b, 20c can be disposed on the connecting rib 131 of the control handle 10 and engage between the groove 121 of the engaging ribs 12 and the assembly base 13, or between the protruding portion 18 of the other control handle 100 and the engaging member 19. The joints 20a, 20b, 20c each have a respective insertion aperture 21. The insertion aperture of the joint 20a has a circular cross-sectional shape; the insertion aperture 21 of the joint 20b has a rhomboidal cross-sectional shape, and the insertion aperture of the joint 20c has an elliptical cross-sectional shape. Each insertion aperture 21 has an assembly aperture 211 at one end, and the assembly aperture 211 further provides a locking member 212 and a washer 213. An assembling slot 22 is disposed adjacent to the insertion aperture 21 of each joint 20a, 20b, 20c, and the assembling slot 22 engages with the screwing member 141 of the control handle 10. Two joints 20a, 20b further have a securing aperture 23 connected to the insertion aperture 21 adjacent to the assembling slot 22, and the securing aperture 23 engages with a securing member 231. Moreover, the panel set 30 has an assembling panel 31 and two ornamental covers 32, 320. The assembling panel 31 is installable onto the wall surface A, and the assembling panel 31 has a connecting depression 311 on one side. The connecting depression 311 is used for accepting the control handles 10, 100, and the connecting depression 311 has two limiting apertures 312 having different diameters, as well as a small aperture 3121, and an installation hole 313. The installation hole 313 has two assembling grooves 3131 on a peripheral edge. The assembling panel 31 further has a through aperture 314, a plug 3141 and a washer 3142 that are respectively provided on opposite sides of the through aperture 314. Furthermore, the assembling panel 31 also has a circular slot 315 for accepting a ring 316, such that the assembling panel 31 can be tightly mounted onto the wall surface A. The ornamental covers 32, 320 respectively have an assembling hole 321, and the assembling hole 321 jackets onto the main body of the water valve 4. The assembling hole 321 of one of the ornamental cover 32 has a diameter smaller than a diameter of the assembling hole 321 of the other ornamental cover 320, and an ornamental cover washer 322 is adhered on each of the ornamental covers 32, 320. Moreover, two limiting columns 323 with different diameters are disposed adjacent to the assembling hole 321 and two second through apertures 324 are also provided on each of the ornamental covers 32, 320. The limiting columns 323 are inserted into the limiting apertures 312 of the assembling panel 31. Since the two limiting columns 323 with different diameters need to be respectively inserted into the corresponding limiting apertures 312, it is easy for the user to align them for correct assembly. In addition, the second through aperture 324 is used for accepting a connecting member 3241. The connecting member 3241 passes through the assembling groove 3131 of the assembling panel 31 and locks with the water valve 4. The assembling hole 321 is further provided with two sleeves 325, 3250 and a cover 326. The sleeve 325 is a short sleeve and the sleeve 3250 is a long sleeve. The cover 326 has a first threaded portion 3261, is tapered as a domed shape at one end, and has a second threaded portion 3262 engaging with a securing ring 327 at a tapered section.

For actual use, please refer to FIG. 3. The faucet control module can be mounted using various water valves 40a, 40b, 40c. The water valve 40a has a first short insertion portion 41a; the first short insertion portion 41a further has a first securing section 42a, and a control rod 43a protrudes from a free end of the water valve 40a. The control rod 43a has a circular cross-sectional shape. The water valve 40b has a second short insertion portion 41b including a second securing section 42b, a control rod 43b protruding from a free end of the water valve 40b, and a switching rod 44 adjacent to the water valve 40b. The control rod 43b has a rhomboidal cross-sectional shape. The water valve 40c has a long insertion portion 41c; and a control rod 43c protruding from a free end of the water valve 40c. The control rod 43c has an elliptical cross-sectional shape and an installation slot 45 at a free end of control rod 43c, as shown in FIG. 8.

Figure 4:
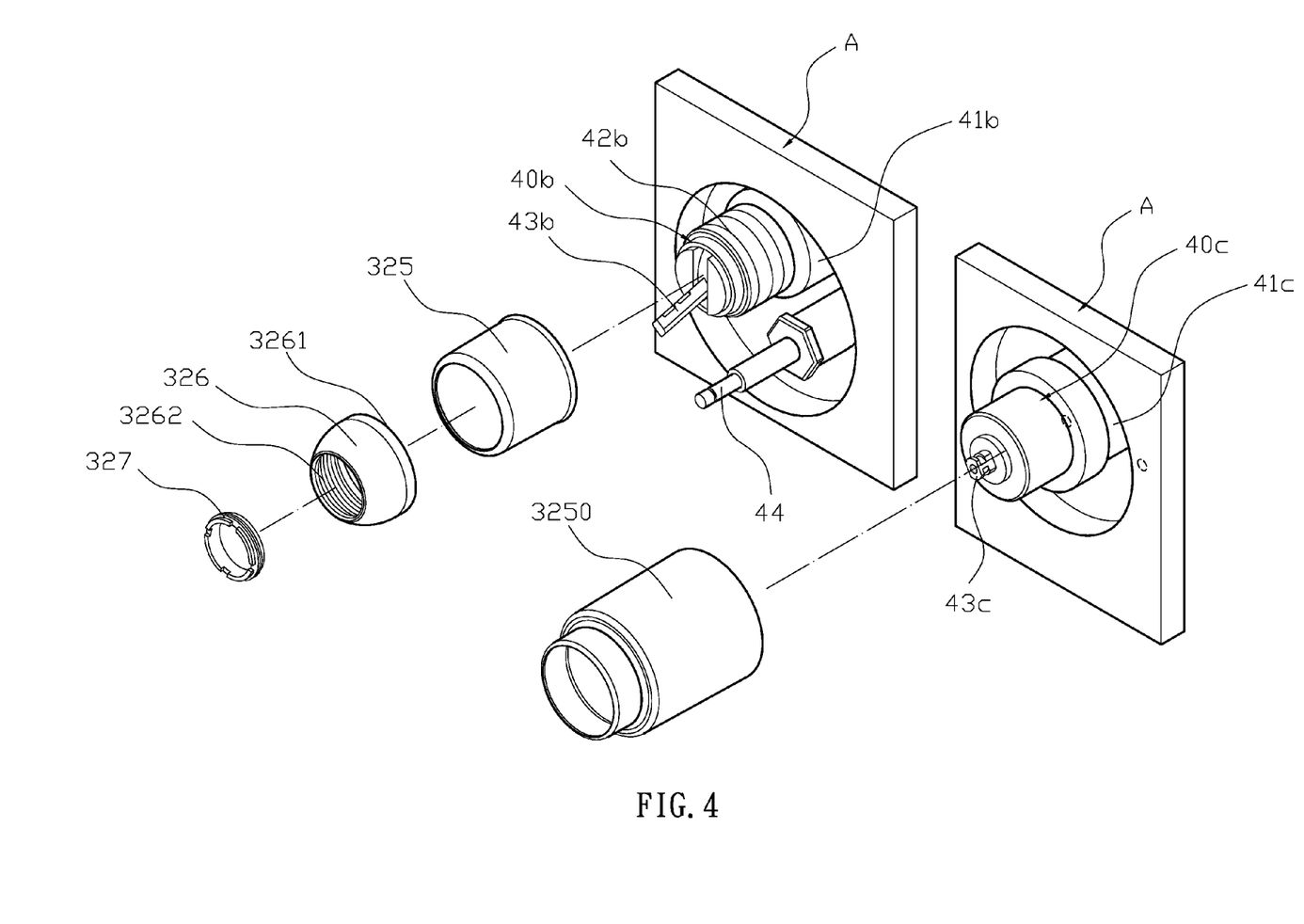
FIG. 4 is schematic drawing showing the installation of a sleeve according to an embodiment of the present invention.
Figure 5:
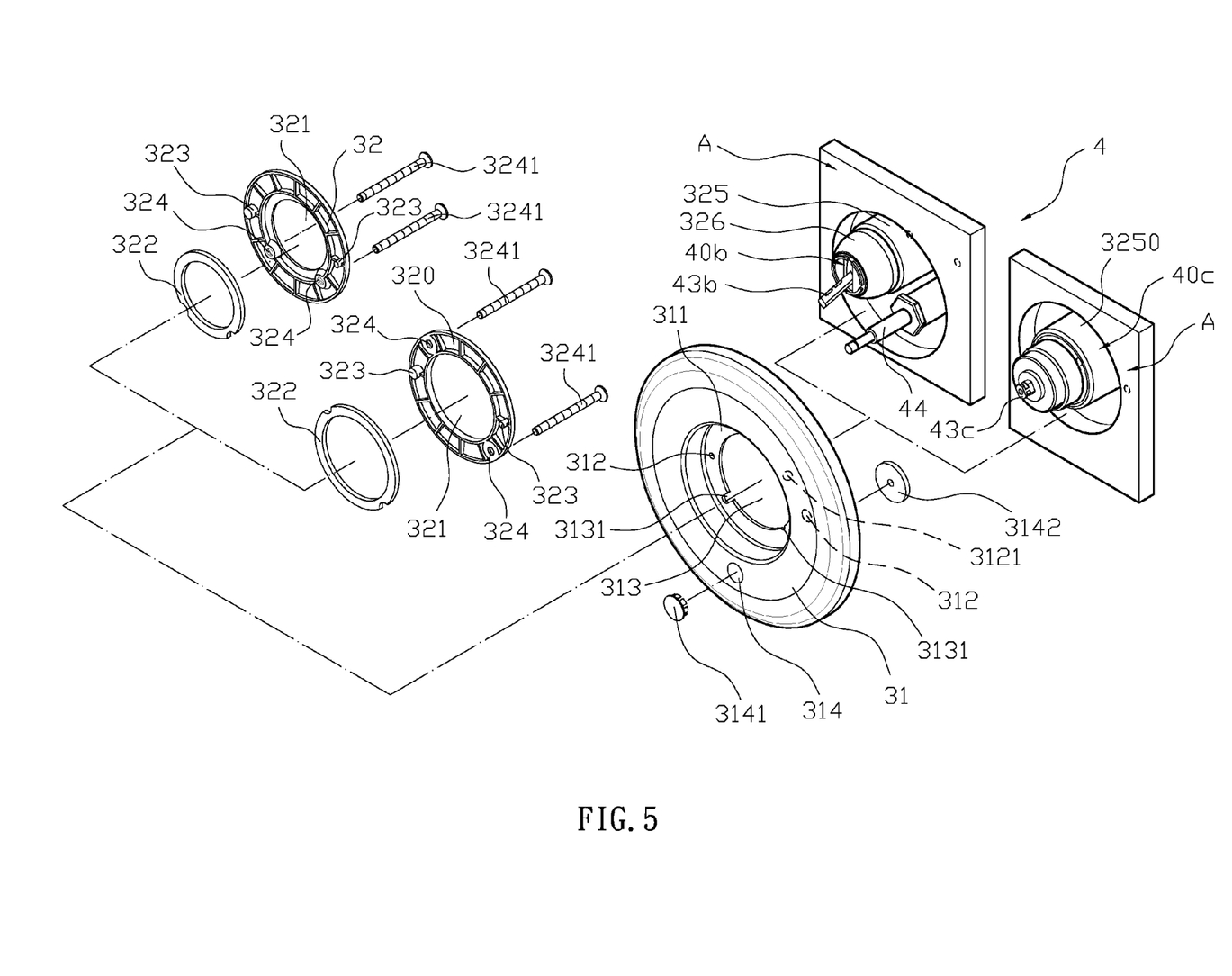
FIG. 5 is schematic drawing showing the installation of a panel set according to an embodiment of the present invention.
Figure 6:
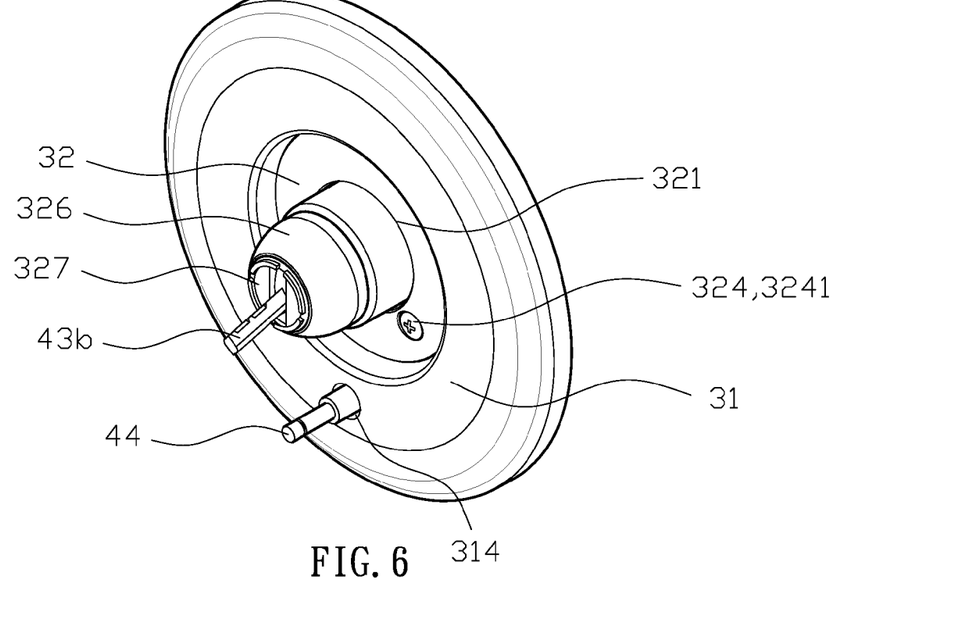
FIG. 6 illustrates assembly of a second combination of the sleeve and the panel set of an embodiment of the present invention.
Figure 9:
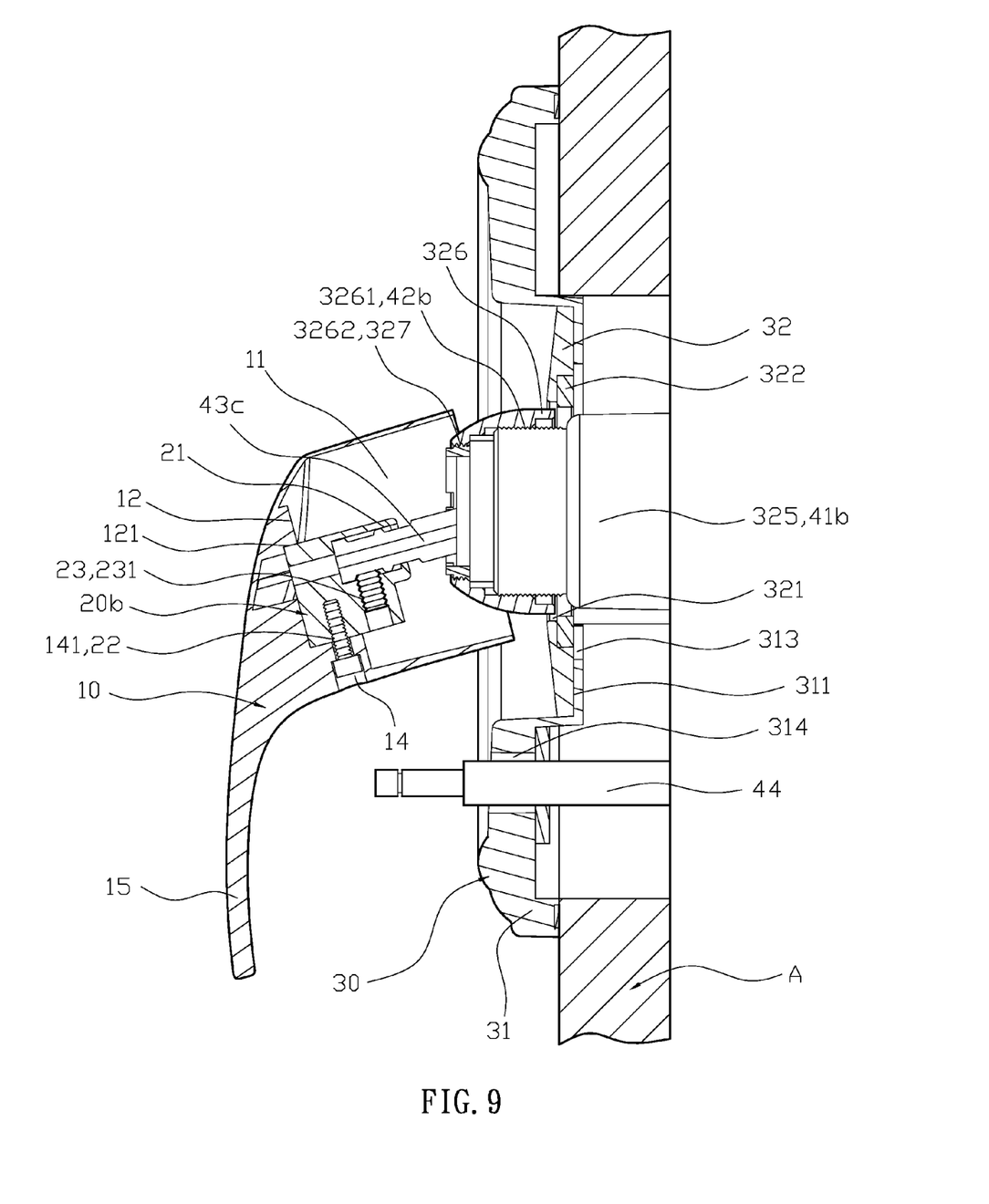
FIG. 9 is a cross-sectional view of a second combination of an embodiment of the present invention.
Figure 10:
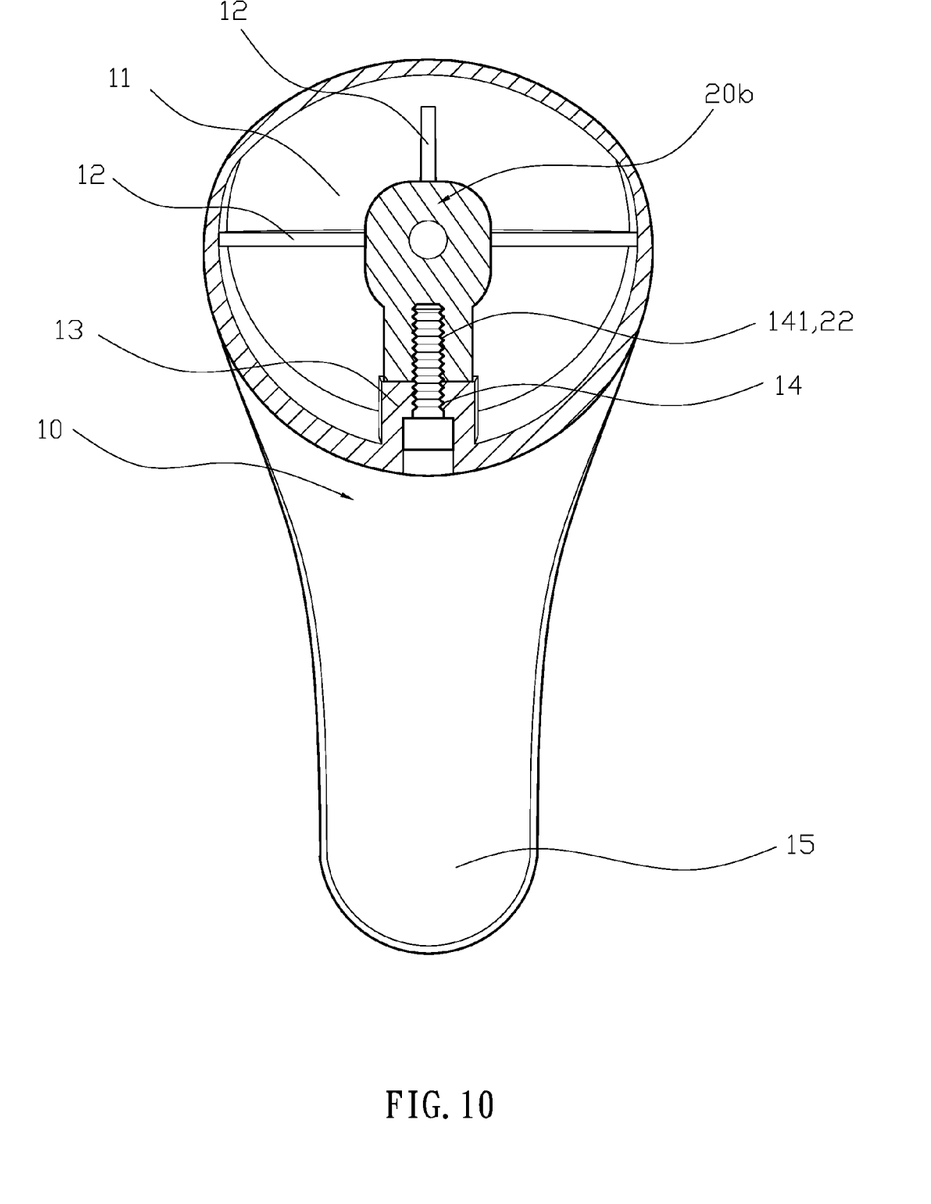
FIG. 10 is another cross-sectional view of the second combination of an embodiment of the present invention.

Please refer to FIG. 4 and FIG. 5 with FIG. 3. When the user wants to install the faucet control module 10 onto the water valve 40a or the water valve 40b, he or she first jackets the sleeve 325 onto the first and second short insertion portions 41a, 41b of the water valves 40a, 40b, screws the first threaded portion 3261 of the cover 326 onto the first and second securing sections 42a, 42b of the water valve 40a, 40b, screws the securing ring 327 onto the second threaded portion 3262 of the cover 326, and mounts the assembling panel 31 of the panel set 30 on a wall surface A. Meanwhile, the user makes the main bodies of the water valve 40a, 40b to pass through the installation hole 313 of the assembling panel 31, detaches the plug 3141 of the assembling panel 31 away from the aperture 314 for the switch rod to pass through, positions the assembling hole 321 of the ornament cover 32 to jacket onto the sleeve 325 of the water valves 40a, 40b, and causes the connecting member 3241 to pass through the second through aperture 324 of the ornamental cover 32 and causes the assembling groove 3131 of the assembling panel 31 to secure onto the bodies of the water valves 40a, 40b, as shown in FIG. 6. Please refer to FIG. 8. Next, the insertion aperture 21 of the joint 20a is jacketed onto the control rods 43a, 43b of the water valves 40a, 40b, the securing member 231 is screwed onto the securing aperture 23 and tightens against the control rods 43a, 43b, and the containment space 11 of the control handle 10 is jacketed onto the joints 20a, 20b. Furthermore, the joints 20a, 20b are disposed on the connecting rib 131 to make the joints 20a, 20b engage between the groove 121 of the engaging ribs 12 and the assembly base 13. Then, the screwing member 141 is placed through the through hole 14 of the control handle 10 and secured into the assembling slot 22 of the joints 20a, 20b, as shown in FIG. 9 and FIG. 10. Alternatively, the containment space 11 of the other control handle 100 is jacketed onto the joints 20a, 20b, and the joints 20a, 20b engage between the protrusion portion 18 and the engaging member 19, the locking member 212 is placed through the washer 213 and the first through aperture 17 and secured with the assembly aperture 211 of the joints 20a, 20b. The sealing cover 161 is positioned to cover the indentation region 16 to complete another control handle 100.

Figure 7:
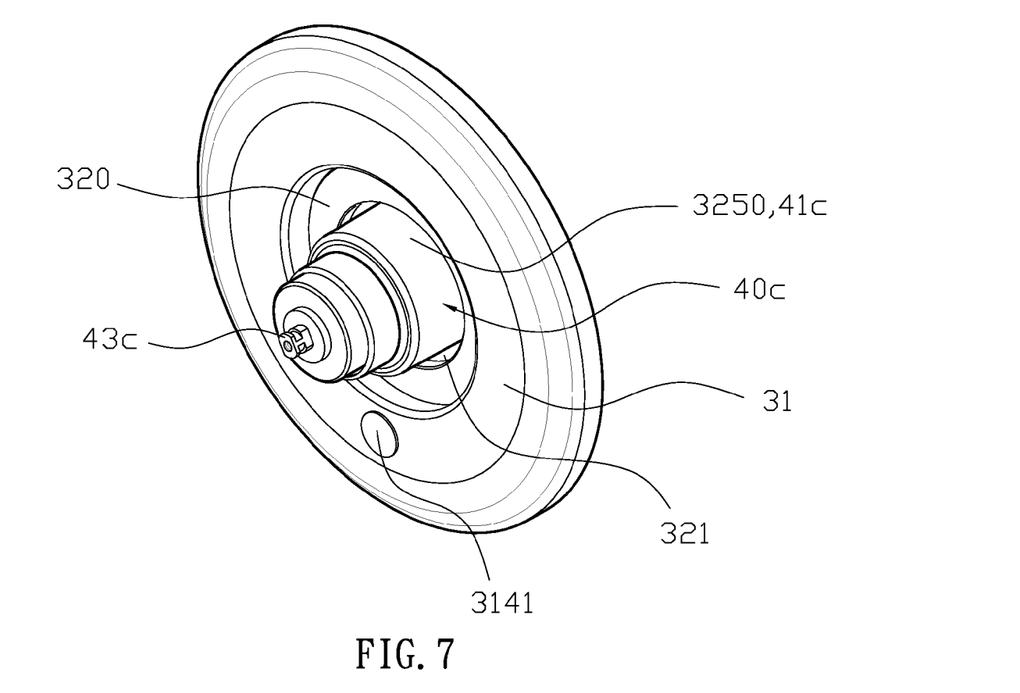
FIG. 7 illustrates assembly of a third combination of the sleeve and the panel set of an embodiment of the present invention.
Figure 11:
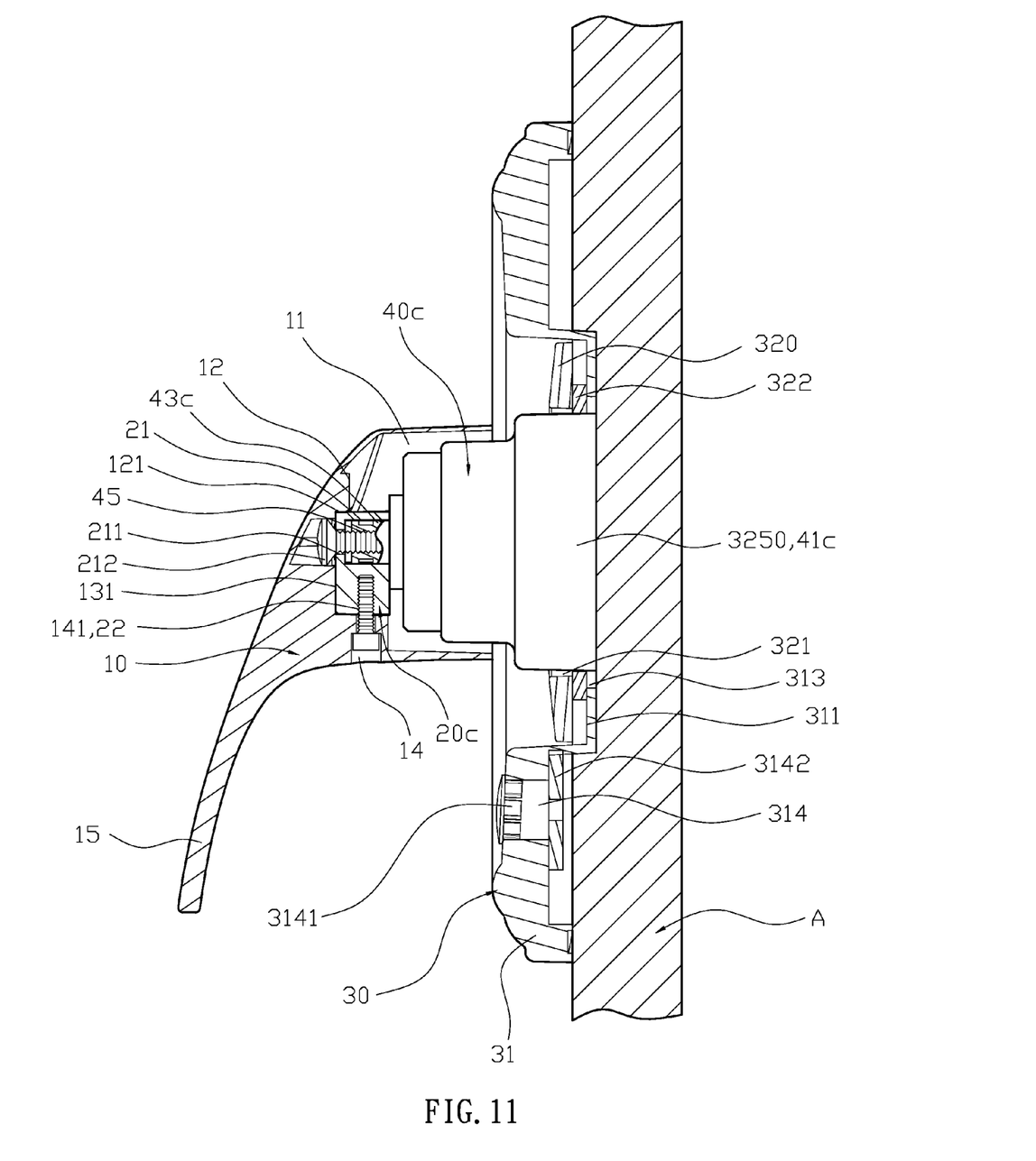
FIG. 11 is a cross-sectional view of a third combination of an embodiment of the present invention.

Please refer FIG. 4 and FIG. 5 with FIG. 3. When the user wants to install the faucet control module onto another water valve 40c, he or she first jackets the sleeve 3250 onto the long insertion portions 41c of the water valve 40c, and mounts the assembling panel 31 of the panel set 30 on a wall surface A. Next, the user causes the main body of the water valve 40c to pass through the installation hole 313 of the assembling panel 31, places the assembling hole 321 of the ornament cover 32 to jacket onto the sleeve 3250 of the water valve 40c, causes the two connecting members 3241 to pass through the second through aperture 324 of the ornament cover 32, and secures the small aperture 3121 of the assembling panel 31 and the assembling groove 3131 onto the body of the water valve 40c, as shown in FIG. 7. Please refer to FIG. 8. Next, the insertion aperture 21 of the joint 20c is jacketed onto the control rods 43c of the water valves 40c. The locking member 212 is placed through the washer 213 and secured with the assembly aperture 211 of the joint 20c and the installation slot 45 of the control rod 43c. The containment space 11 of the other control handle 100 is jacketed onto the joint 20c. The joint 20c is disposed on the connecting rib 131 to cause the joint 20c to engage between the groove 121 of the engaging ribs 12 and the assembly base 13. The screwing member 141 is then placed through the through hole 14 of the control handle 10 and secured onto the assembling slot 22 of the joint 20c, as shown in FIG. 11. Alternatively, the containment space 11 of the other control handle 100 is jacketed onto the joint 20c. The joint 20c engages between the protrusion portion 18 and the engaging member 19; the locking member 212 is placed through the washer 213 and the first through aperture 17 and secured with the assembly aperture 211 of the joint 20c and the installation slot 45 of the control rod 43c. The sealing cover 161 is positioned to cover the indentation region 16 to complete another control handle 100. Since, the joints 20a, 20b, 20c, the sleeves 325, 3250 and the ornament covers 32, 320 can be correspondingly alternated for the various water valves 40a, 40b, 40c, the control handles 10, 100 and the panel set 30 can be installed with the various types of water valves, which can provide variety and convenience.

With the above-mentioned structure, the following benefits can be obtained: the joints 20a, 20b, 20c, the sleeves 325, 3250 and the ornament covers 32, 320 can be correspondingly alternated for the various water valves 40a, 40b, 40c. The control handles 10, 100 and the panel set 30 can be installed with various types of water valves, which can provide variety and convenience.

Although the present invention has been explained in relation to its preferred embodiment, it is to be understood that many other possible modifications and variations can be made without departing from the spirit and scope of the invention as hereinafter claimed.

What is claimed is:

1. A wall-mounted faucet control module configured for assembly with a recessed water valve comprising:
   at least two control handles, each control handle having a containment space at a bottom face, the containment space of a first of the control handles having a plurality of engaging ribs around an opening of the containment space and an assembly base, the engaging ribs having a groove at an end, each assembly base having a connecting rib and a through hole adjacent to the connecting rib, the through hole engaging with a screwing member, at least one of the control handles having an indentation slot at a top face, the indentation slot engaging with a sealing cover, the indentation slot having a first through aperture connected to the containment space, a U-shaped protruding portion disposed at a closed end of the containment space around the first through aperture, an engaging member disposed in the closed end of the containment space facing an opening of the protruding portion;
   a plurality of joints, each joint disposed on the connecting rib of a corresponding control handle and engaging between the groove of the engaging ribs and the assembly base or between the protruding portion of another control handle and the engaging member, each joint having an insertion aperture, each insertion aperture accepting a valve rod of the water valve, each insertion aperture having a different cross-sectional shape, each insertion aperture having an assembly aperture at an end, the assembly aperture provided with a locking member; an assembling slot is disposed adjacent to the insertion aperture of at least one of the joints, the assembling slot engaging with the screwing member of the control handle, at least another two of the joints having a securing aperture connected to the insertion aperture adjacent to the assembling slot, the securing aperture engaging with a securing member; and
   a panel set having an assembling panel and at least two ornamental covers, the assembling panel installable onto a wall, the assembling panel having a connecting depression on one side, the connecting depression accepting the control handles, the connecting depression having an aperture and an installation hole, the installation hole having at least two assembling grooves at a peripheral edge, the ornamental cover engaging with the connecting slot of the assembling panel, each ornamental cover having an assembling hole, the assembling hole facing the installation hole of the assembling panel, the assembling hole jacketing onto the main body of the water valve, the assembling holes of the at least two ornamental covers having different diameters, more than one second through apertures disposed on the ornamental cover adjacent the assembling hole, the second through aperture accepting a connecting member, the connecting member passing through the assembling groove of the assembling panel and locked with the water valve.

2. The wall-mounted faucet control module as claimed in claim 1, wherein the engaging ribs and the assembly base of one of the control handles are evenly disposed, and the connecting rib has a height corresponding to the height of the groove of the engaging ribs.

3. The wall-mounted faucet control module as claimed in claim 1, wherein the control handle further has an extended handle portion.

4. The wall-mounted faucet control module as claimed in claim 1, wherein the insertion aperture of one of the joints has a circular cross-sectional shape, the insertion aperture of another joint has a rhomboidal cross-sectional shape, and the insertion aperture of another joint has an elliptical cross-sectional shape.

5. The wall-mounted faucet control module as claimed in claim 1, wherein the connecting slot of the assembling panel further has at least two limiting apertures, the ornamental cover has at least two limiting columns adjacent to the assembling hole, and the limiting columns are respectively inserted into the limiting apertures of the assembling panel.

6. The wall-mounted faucet control module as claimed in claim 1, wherein the at least two limiting apertures of the assembling panel have different diameters, the at least two limiting columns of the ornamental cover have different diameters, and the limiting columns are respectively inserted into the corresponding limiting aperture having the same diameter.

7. The wall-mounted faucet control module as claimed in claim 1, wherein the assembling hole of the ornamental cover is provided with at least two sleeves, one sleeve shorter than the other sleeve.

8. The wall-mounted faucet control module as claimed in claim 1, wherein the assembling hole of the ornamental cover is provided with a cover, the cover has a first threaded portion, is tapered as a domed shape at one end, and has a second threaded portion engaging with a securing ring at a tapered section.

* * * * *